United States Patent
Toyoshiba

(10) Patent No.: US 11,947,583 B2
(45) Date of Patent: Apr. 2, 2024

(54) 2D MAP GENERATION APPARATUS, 2D MAP GENERATION METHOD, AND 2D MAP GENERATION PROGRAM

(71) Applicant: FRONTEO, Inc., Tokyo (JP)

(72) Inventor: Hiroyoshi Toyoshiba, Tokyo (JP)

(73) Assignee: FRONTEO, Inc., Tokyo (JP)

( * ) Notice: Subject to any disclaimer, the term of this patent is extended or adjusted under 35 U.S.C. 154(b) by 0 days.

(21) Appl. No.: 17/907,729

(22) PCT Filed: Sep. 18, 2020

(86) PCT No.: PCT/JP2020/035513
§ 371 (c)(1),
(2) Date: Sep. 29, 2022

(87) PCT Pub. No.: WO2022/003991
PCT Pub. Date: Jan. 6, 2022

(65) Prior Publication Data
US 2023/0131349 A1  Apr. 27, 2023

(30) Foreign Application Priority Data
Jun. 29, 2020 (JP) .................. 2020-111604

(51) Int. Cl.
G06F 16/387 (2019.01)
G06F 16/31 (2019.01)

(52) U.S. Cl.
CPC .......... *G06F 16/387* (2019.01); *G06F 16/328* (2019.01)

(58) Field of Classification Search
CPC .................. G06F 16/387; G06F 16/328
See application file for complete search history.

(56) References Cited

U.S. PATENT DOCUMENTS 7,502,780 B2  3/2009 Thorpe
8,818,979 B2  8/2014 Nakamura et al.
(Continued)

FOREIGN PATENT DOCUMENTS

JP  4540970 B2  9/2010
JP  5159772 B2  3/2013
(Continued)

OTHER PUBLICATIONS

Hayakawa Kazuhiro et al, "A global map of the WWW auto-generated from user's access history", IPSJ SIG Technical Report, Jan. 16, 1997, vol. 92, No. 2, pp. 17-24, ISSN: 0919-6072, in particular, sections 3, 4, 6, Fig. 2. (see English Abstract and ISR).

*Primary Examiner* — Baoquoc N To
(74) *Attorney, Agent, or Firm* — POLSINELLI PC

(57) ABSTRACT

Included are a 2D processing unit 11 that generates 2D latitude and longitude information by dimensionally compressing a feature vector generated from target information, and a map generation unit 12 that generates a 2D map in which a plurality of pieces of target information is plotted on a 2D plane based on a plurality of pieces of latitude and longitude information generated for a plurality of pieces of target information. A plurality of pieces of target information is plotted based on a feature vector in a coordinate system of a closed space having finite latitude and longitude values, so that a plot position of target information can be appropriately determined in a wide coordinate space based on latitude and longitude without performing processing such as defining a finite target area in a coordinate system of an infinite open space, and a state in which pieces of target information having a high similarity are plotted in a shape of a mass at close positions is likely to occur appropriately at a plurality of locations.

8 Claims, 5 Drawing Sheets

(56) References Cited

U.S. PATENT DOCUMENTS

| | | | | |
|---|---|---|---|---|
| 8,886,445 B1 * | 11/2014 | Skoog | ................. | G06T 17/20 |
| | | | | 701/120 |
| 2004/0107194 A1 | 6/2004 | Thorpe | | |
| 2010/0153356 A1 | 6/2010 | Nakamura et al. | | |

FOREIGN PATENT DOCUMENTS

| WO | WO 2016/171186 A1 | 10/2016 |
|---|---|---|
| WO | WO 2019/093172 A1 | 5/2019 |

\* cited by examiner

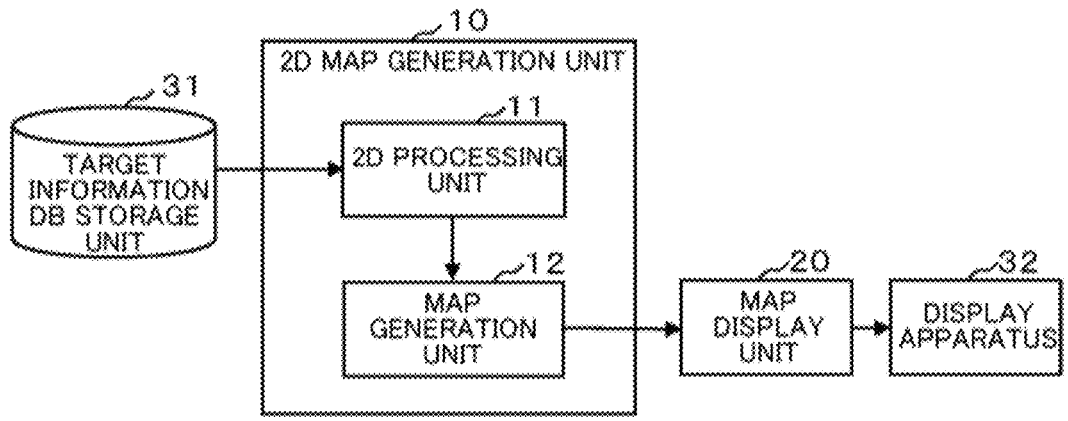
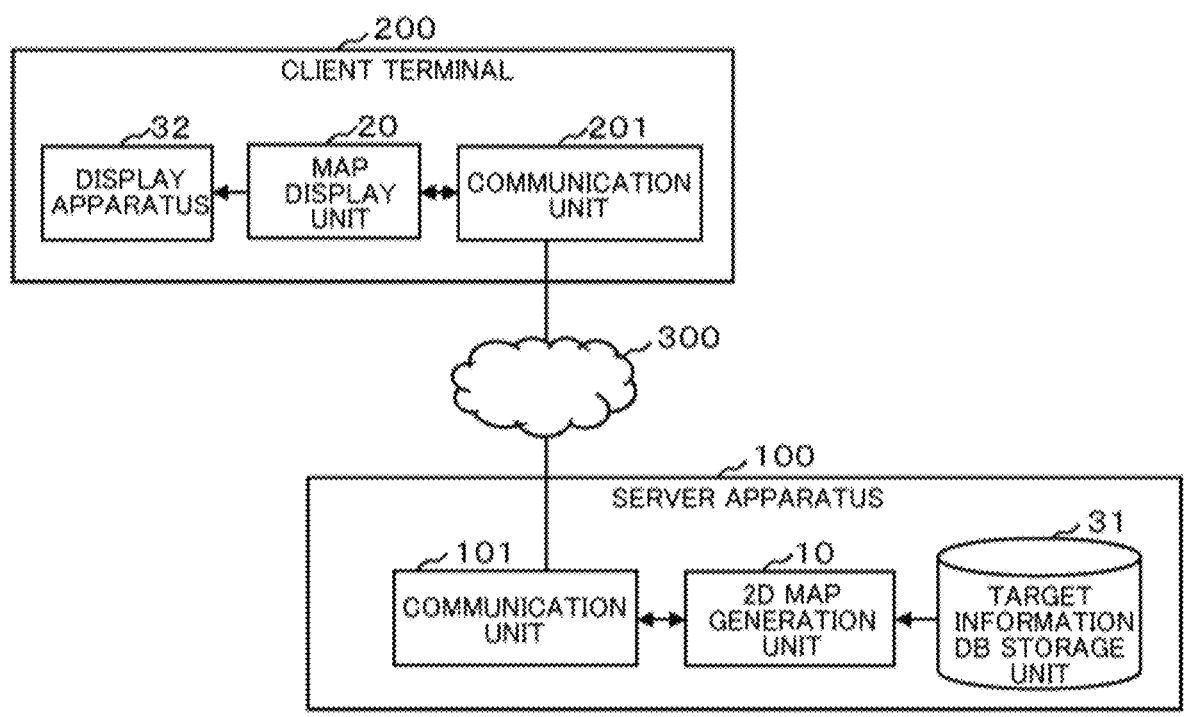

FIG. 3
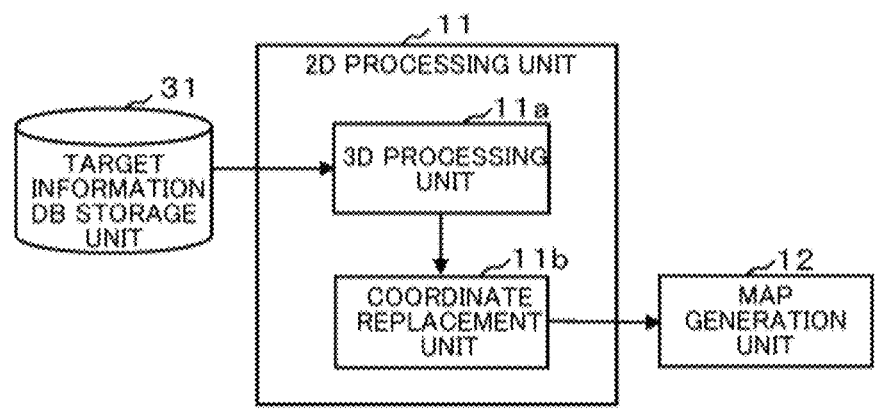
FIG. 4
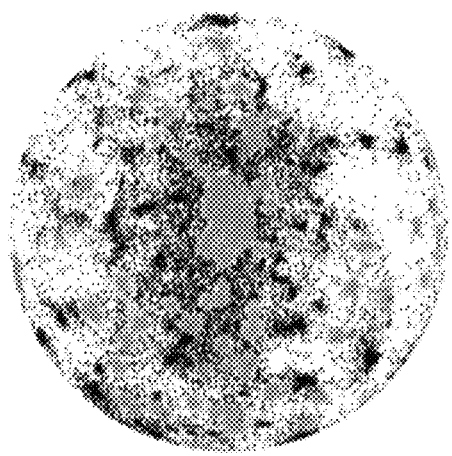
(a)
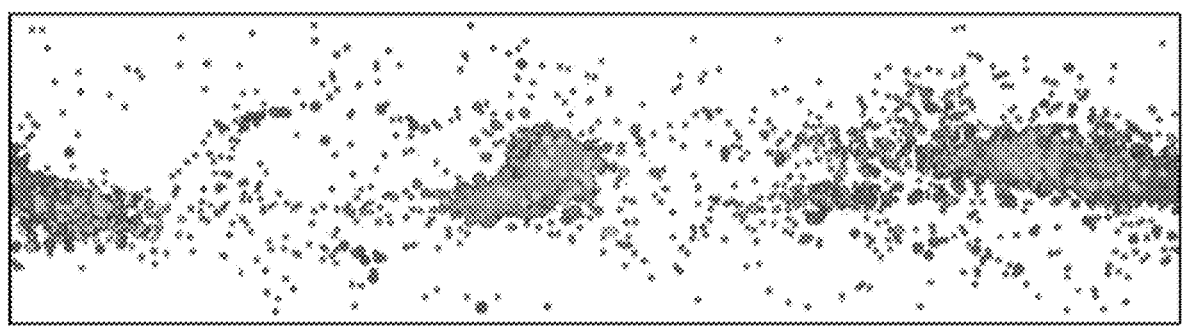
(b)

$$\begin{pmatrix} dw_{11} & dw_{12} & \cdots & dw_{1n} \\ dw_{21} & dw_{22} & \cdots & dw_{2n} \\ \vdots & \vdots & \ddots & \vdots \\ dw_{m1} & dw_{m2} & \cdots & dw_{mn} \end{pmatrix}$$

$$\begin{pmatrix} \begin{pmatrix} dw_{11} \\ dw_{21} \\ \vdots \\ dw_{m1} \end{pmatrix} & \begin{pmatrix} dw_{12} \\ dw_{22} \\ \vdots \\ dw_{m2} \end{pmatrix} & \cdots & \begin{pmatrix} dw_{1n} \\ dw_{2n} \\ \vdots \\ dw_{mn} \end{pmatrix} \end{pmatrix}$$

2D MAP GENERATION APPARATUS, 2D MAP GENERATION METHOD, AND 2D MAP GENERATION PROGRAM

CROSS REFERENCE TO RELATED APPLICATIONS

This application is a National Phase filing under 35 U.S.C. § 371 of PCT/JP2020/035513 filed on Sep. 18, 2020; which application in turn claims priority to Application No. 2020-111604 filed in Japan on Jun. 29, 2020. The entire contents of each application are hereby incorporated by reference.

TECHNICAL FIELD

The present invention relates to a two-dimensional (2D) map generation apparatus, a 2D map generation method, and a 2D map generation program, and is particularly suitable for use in a technology for generating a 2D map in which a plurality of pieces of target information is plotted on a 2D plane based on a feature vector generated from target information.

BACKGROUND ART

Conventionally, there has been a known technology for displaying a 2D map in which a plurality of search targets is plotted on a 2D plane based on a feature vector generated from a search target, extracting search targets corresponding to plots included in a region designated by a user operation, and displaying a list of the extracted search targets (for example, see Patent Documents 1 and 2).

A document search apparatus described in Patent Document 1 displays a map in which a plurality of documents is plotted on a 2D plane based on a document vector. Then, when a user designates a desired region on a 2D map in which a plot is positioned according to a degree of relevance between documents in this way, query vectors of a plurality of documents contained in the designated region are synthesized, a document vector in an information database is compared with a synthetic query vector, and documents corresponding to document vectors close to the synthetic query vector are extracted and displayed in a list.

In the document search apparatus described in Patent Document 1, a 2D map generator reads from the information database a document vector corresponding to a document extracted based on a search keyword entered by the user, and calculates a similarity between respective documents. For example, an inner product of document vectors having weights of words contained in the respective documents as elements is calculated to calculate a similarity between the respective documents. The 2D map generator reduces the dimension of a multidimensional document vector to obtain a 2D document vector and performs conversion into an x-coordinate and a y-coordinate so that similar documents are placed closet together on the 2D map based on the similarity between the respective document vectors. The 2D map generator creates a coordinate list of the x-coordinate and the y-coordinate of each document, and creates a 2D map based on the coordinate list.

In addition, an information search apparatus described in Patent Document 2 generates and displays a 2D map illustrating respective information items corresponding to respective positions in an array so that similar information items are mapped to close positions based on a similarity of information items from a set of the information items. Further, when the user performs an operation to define an arbitrary boundary region on the 2D map, by specifying an information item which is present as information indicating a position in the defined boundary region and corresponds to a position in the array as an item corresponding to a search query, related search is performed for the boundary region, and a list of information items specified as a result of the related search is displayed.

In the information search apparatus described in Patent Document 2, for example, the information item is a document. The information search apparatus generates a multi-dimensional feature vector based on an abstract expression representing a frequency of a term used in a document (for example, a term frequency histogram composed by counting the number of times a word in a dictionary appears in an individual document). Then, after reducing the dimension of the feature vector, a semantic map is cheated by projecting the feature vector onto a 2D self-organizing map. As an example, mapping to two dimensions is performed by clustering feature vectors using Kohonen's self-organizing map. By assigning the feature vector for each document to the map, a map position according to an x-coordinate and a y-coordinate is generated for each document, and a relationship between documents can be visualized according to a position thereof.

Patent Document 1: Japanese Patent No. 5,159,772
Patent Document 2: Japanese Patent No. 4,540,970

SUMMARY OF THE INVENTION

Technical Problem

In the technologies described in Patent Documents 1 and 2, a plot position of each document on the 2D map is determined by dimensionally compressing the multidimensional feature vector into 2D xy-coordinate information. A coordinate system using xy-coordinates is an open space in which a value of the x-coordinate and a value of the y-coordinate can be taken infinitely. For this reason, in order to plot a plurality of documents in this open space coordinate system, it is necessary to define a target area in the open space coordinate system by setting predetermined upper and lower limits, and transfer the multidimensional vector information into the defined target area.

However, even when a similarity between feature vectors is calculated to determine a plot position of each document, it is difficult to properly define a finite target area in an infinite open space. Thus, there is a problem that when the target area is narrow, a relative distance between the plot positions is not appropriate, and a plurality of dispersed clusters is hardly formed on the map. The term "cluster" mentioned herein refers to a mass-shaped region formed by plotting documents having similar feature vectors at close positions. In the technologies described in Patent Documents 1 and 2, a relationship between documents is visualized as illustrated in FIG. 10 by determining the plot position of each document based on a similarity relationship of feature vectors. However, in a narrow target area limited from the coordinate system which is originally infinite space, there is a problem that a plurality of different clusters is hardly visualized in a dispersed state.

The invention has been made to solve such a problem, and an object of the invention is to allow generation of a 2D map in which a plurality of dispersed clusters is likely to appear with regard to a 2D map generated by plotting a plurality of pieces of target information on a 2D plane based on a feature vector generated from target information.

Solution to Problem

To solve the above-mentioned problem, in the invention, 2D latitude and longitude information is generated by performing a dimension compression process on a feature vector generated from target information, and a 2D map in which a plurality of pieces of target information is plotted on a 2D plane is generated based on a plurality of pieces of latitude and longitude information generated for a plurality of pieces of target information.

Advantageous Effects of the Invention

In the invention configured as described above, a coordinate system plotted using latitude and longitude information is a closed space in which latitude and longitude values are originally finite. According to the invention, since it is sufficient to plot a plurality of pieces of target information based on a feature vector for a coordinate system of this closed space, there is no need to perform processing such as defining a finite target area in a coordinate system of an infinite open space, and in a wide coordinate space based on latitude and longitude, a plot position of target information can be appropriately determined according to a property of information possessed by a feature vector. For this reason, a state in which pieces of target information having a high similarly of feature vectors are plotted in a shape of a mass at close positions is likely to occur appropriately at a plurality of locations. As described above, according to the invention, with respect to a 2D map generated by plotting a plurality of pieces of target information on a 2D plane based on a feature vector generated from target information, it is possible to generate a 2D map in which a plurality of dispersed clusters is likely to appear.

BRIEF DESCRIPTION OF THE DRAWINGS

FIG. 1 is a diagram illustrating a configuration example of a 2D map visualization system including a 2D map generation apparatus according to a first embodiment.

FIG. 2 is a diagram illustrating another configuration example of the 2D map visualization system including the 2D map generation apparatus according to the first embodiment.

FIG. 3 is a block diagram illustrating a more specific functional configuration of a 2D processing unit.

FIG. 4 is a diagram for description of processing content of a three-dimensional (3D) processing unit and a coordinate replacement unit.

MODE FOR CARRYING OUT THE INVENTION

First Embodiment

Figure 5:
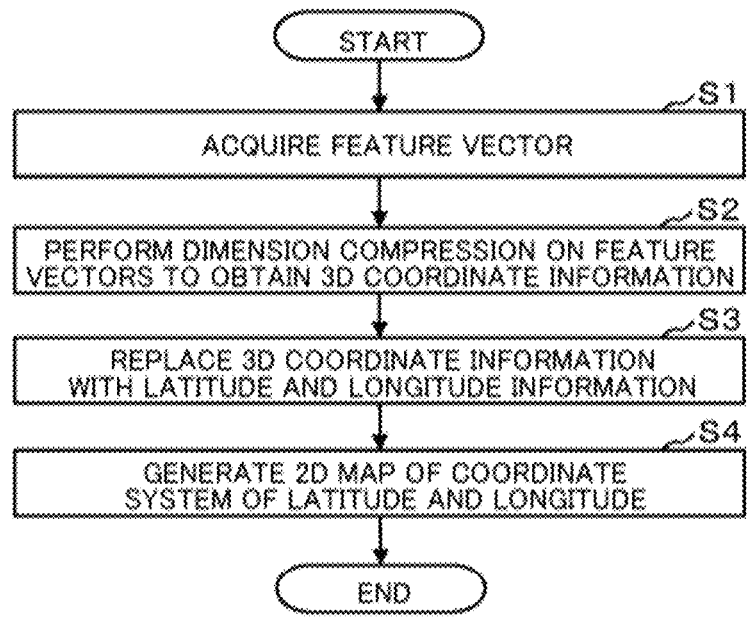
FIG. 5 is a flowchart illustrating an operation example of a 2D map generation unit according to the first embodiment.

Hereinafter, a first embodiment of the invention will be described with reference to the drawings. FIG. 1 is a diagram illustrating a configuration example of a 2D map visualization system including a 2D map generation apparatus according to the first embodiment. As illustrated in FIG. 1, the 2D map visualization system of the present embodiment includes a 2D asap generation unit 10, a map display unit 20, a target information DB storage unit 31, and a display apparatus 32 according to the first embodiment. The 2D map generation unit 10 includes a 2D processing unit 11 and a map generation unit 12 as functional configurations.

Each of the above functional blocks 11, 12, and 20 can be configured by any of hardware, Digital Signal Processor (DSP), and software. For example, in the case of being configured by software, each of the above functional blocks 11, 12, and 20 actually include a CPU, a RAM, a ROM, etc., of a computer, and is implemented by operating a program stored in a recording medium such as a RAM, a ROM, a hard disk, or a semiconductor memory.

The 2D map generation unit 10 and the map display unit 20 may be provided in, for example, one computer. For example, the 2D map generation unit 10 and the map display unit 20 may be provided in one personal computer. In this case, the target information DB storage unit 31 and the display apparatus 32 may be provided in the personal computer, or way be connected to the personal computer by wire or wirelessly.

Further, the 2D map generation unit 10 and the map display unit 20 may be provided in a distributed manner in a plurality of computers. A configuration example in this case is illustrated in FIG. 2. In the example illustrated in FIG. 2, the 2D map generation unit 10 and the target information DB storage unit 31 are provided in a server apparatus 100, and the map display unit 20 and the display apparatus 32 are provided in a client terminal 200. The server apparatus 100 and the client terminal 200 are connected by a communication network 300 such as the Internet, and data communication is performed via communication units 101 and 201 thereof.

For example, the client terminal 200 requests the server apparatus 100 to display a 2D map. In response to this request, the 2D map generation unit 10 of the server apparatus 100 generates the 2D map by performing processing described below, and provides the 2D map to the client terminal 200. The map display unit 20 of the client terminal 200 causes the display apparatus 32 to display the 2D map provided from the server apparatus 100. Specifically, it is possible to perform the above processing using a web browser provided in the client terminal 200.

The target information OB storage unit 31 is a nonvolatile storage medium that stores a database related to target information. The target information is information to be plotted on a 2D map, and arbitrary information can be targeted. For example, as the target information, it is possible to use text information, image information, audio information, vibration information, biological information (measurement information by a medical device, a sensor, etc.), weather information, etc., and any information can be used without being limited thereto.

The target information OB storage unit 31 stores at least data of a feature vector generated from the target information as data related to the target information. The feature vector is data that represents a feature of the target information (feature that can identify the target information) as a combination of values of a plurality of elements, and the number of elements corresponds to the number of components of the feature vector, that is, the number of dimensions.

In the first embodiment and a second embodiment described later, a multidimensional feature vector whose dimension is larger than three is used.

In the first embodiment, a feature vector is generated in advance from each of a plurality of pieces of target information using a feature vector computation apparatus (not illustrated), and data of the generated feature vector is stored in the target information DB storage unit 31. The feature vector can be generated by applying a known technology. Note that the target information DB storage unit 31 may store data of target information and data of a feature vector corresponding thereto as a data set.

The 2D map generation unit 10 generates a 2D map in which a plurality of pieces of target information is plotted on a 2D plane based on a feature vector generated from target information (feature vector stored in the target information DB storage unit 31), and corresponds to a 2D map generation apparatus in the claims. Hereinafter, specific processing content of the 2D map generation unit 10 will be described with reference to functional blocks of the 2D processing unit 11 and the map generation unit 12.

The 2D processing unit 11 generates 2D latitude and longitude information by performing a dimension compression process on a feature vector. Here, the 2D processing unit 11 generates a plurality of pieces of latitude and longitude information by performing a dimension compression process on each of a plurality of feature vectors stored in the target information DB storage unit 31. That is, the 2D processing unit 11 replaces multidimensional component information of one feature vector with 2D information including latitude information and longitude information.

FIG. 3 is a block diagram illustrating a more specific functional configuration example of the 2D processing unit 11. As illustrated in FIG. 3, the 2D processing unit 11 includes a 3D processing unit 11a and a coordinate replacement unit 11b as specific functional configurations. FIG. 4 is a diagram for description of processing content of the 3D processing unit 11a and the coordinate replacement unit 11b. Hereinafter, the processing content of the 3D processing unit 11a and the coordinate replacement unit 11b will be described with reference to FIG. 4.

The 3D processing unit 11a reduces the dimension of the feature vector and generates 3D coordinate information at a position where a distance from an origin is constant. Here, the 3D processing unit 11a generates a plurality of pieces of 3D coordinate information by performing a dimension compression process on each of the plurality of feature vectors stored in the target information DB storage unit 31. For example, the 3D coordinate information is information about polar coordinates $(r, \theta, \varphi)$ on which a condition that a distance t from an origin in a 3D space is constant is imposed. Alternatively, the 3D coordinate information may be information about Cartesian coordinates $(x, y, z)$ on which a condition that a position corresponding to a value r of the polar coordinates is constant is imposed. Hereinafter, a description will be given on the assumption that the 3D coordinate information is information about polar coordinates $(r, \theta, \varphi)$ (r is a fixed value).

For example, when it is presumed that the number of a plurality of feature vectors (the number of pieces of target information) stored in the target information DB storage unit 31 is M and the number of dimensions of the feature vector (the number of components of the feature vector) is N, respective component values of the 4 feature vectors can be represented as a matrix of N rows×N columns (hereinafter referred to as a feature vector matrix). The 3D processing unit 11a performs a known dimension compression process on this feature vector matrix to dimensionally compress the matrix into a matrix of M rows×3 columns. Values in these three columns are information about polar coordinates $(r, \theta, \varphi)$. As the known dimension compression process, for example, it is possible to use principal component analysis (PCA), singular value decomposition (SVD), etc.

In this way, by compressing the dimension of the feature vector matrix using the PCA or SVD method, the feature vector matrix can be low-rank approximated without damaging the features of the respective pieces of target information represented by the feature vector matrix as much as possible. FIG. 4(a) is an image diagram illustrating respective positions (positions of polar coordinates $(r, \theta, \varphi)$ specified by a plurality of pieces of 3D coordinate information generated by the 3D processing unit 11a. As illustrated in FIG. 4(a), the respective positions specified by the plurality of pieces of 3D coordinate information generated from the plurality of feature vectors are present on a surface of a sphere having a constant distance from an origin.

The coordinate replacement unit 11b replaces the plurality of pieces of 3D coordinate information generated by the 3D processing unit 11a with latitude and longitude information, respectively. As described above, all the plurality of pieces of 3D coordinate information generated by the 3D processing unit 11a is coordinate information having a constant distance from the origin, and all the positions specified by the 3D coordinate information are present on the surface of the sphere. By simulating this sphere as the earth, it is possible to perceive each position on the surface of the sphere as a combination of latitude and longitude. The coordinate replacement unit 11b sets a predetermined position (=position of $(r, \theta_o, \varphi_o)$) on the sphere specified by the 3D coordinate information having a constant value r at a position of 0 degrees latitude and 0 degrees longitude, and replaces each piece of the 3D coordinate information with latitude and longitude information with reference to this predetermined position.

The map generation unit 12 generates a 2D map in which a plurality of pieces of target information is plotted in a 2D coordinate system of latitude and longitude based on a plurality of pieces of latitude and longitude information generated by the 2D processing unit 11 for the plurality of pieces of target information. FIG. 4(b) is a diagram illustrating an example of the 2D map generated by the map generation unit 12. The 2D map illustrated in FIG. 4(b) corresponds to a map obtained by developing a 3D space illustrated in FIG. 4(a) using a process of "map projection method" for projecting information on the surface of the earth onto a plane. The 2D map illustrated in FIG. 4(b) represents a 2D plane according to the orthomorphic projection (Mercator projection), which is one of map projection methods, and respective positions specified by the plurality of pieces of latitude and longitude information generated from the plurality of feature vectors are plotted on this 2D plane.

As illustrated in FIG. 4(b), in the 2D map generated by the present embodiment, mass-shaped clusters of a plurality of plot positions are dispersed and present at a plurality of locations on the 2D plane. That is, a plurality of different clusters is seen in a neatly separated state, which is a great difference from the 2D map of FIG. 10 generated by the conventional technology.

The map display unit 20 causes the display apparatus 32 to display the 2D map generated by the map generation unit 12. That is, the map display unit 20 causes the display apparatus 32 to display the 2D map illustrated in FIG. 4(b). Note that here, an example in which a 2D map representing a 2D plane according to the orthomorphic projection (Mercator projection) is used as the 2D map has been described. However the invention is not limited thereto. For example, it is possible to use a 2D map representing a 2D plane according to the equal area projection such as the Mollweide projection, or the equidistant projection.

FIG. 5 is a flowchart illustrating an operation example of the 2D map generation unit 10 according to the first embodiment configured as described above. First, the 2D processing unit 11 of the 2D map generation unit 10 acquires data of a plurality of feature vectors from the target information DB storage unit 31 (step S1). The 3D processing unit 11a included in the 2D processing unit 11 generates a plurality of pieces of 3D coordinate information by performing a dimension compression process on each of the plurality of feature vectors acquired in step S1 (step S2).

Subsequently, the coordinate replacement unit 11b replaces each of the plurality of pieces of 3D coordinate information generated by the 3D processing unit 11a with latitude and longitude information (step S3). Then, the map generation unit 12 generates a 2D map in which a plurality of pieces of target information is plotted in a 2D coordinate system of latitude and longitude based on the plurality of pieces of latitude and longitude information generated by the coordinate replacement unit 11b for the plurality of pieces of target information (step S4).

As described in detail above, in the first embodiment, a dimension compression process is performed on each of a plurality of feature vectors generated from a plurality of pieces of target information and stored in the target information DB storage unit 31 to generate 2D latitude and longitude information for each of the plurality of pieces of target information, and a 2D map in which a plurality of pieces of target information is plotted on a 2D plane is generated based on a plurality of pieces of the latitude and longitude information.

According to the first embodiment configured in this way, since it is sufficient to plot a plurality of pieces of target information based on feature vectors for a coordinate system of a closed space specified by latitude and longitude information, there is no need to perform processing such as defining a finite target area in a coordinate system of an infinite open space, and in a wide coordinate space based on latitude and longitude, a plot position of target information can be appropriately determined according to a property of information possessed by a feature vector. For this reason, a state in which pieces of target information having a high similarly of feature vectors are plotted in a shape of a mass at close positions is likely to occur appropriately at a plurality of locations. As described above, according to the first embodiment, it is possible to generate a 2D map in which a plurality of dispersed clusters is likely to appear.

The 2D map visualization system of the present embodiment can be applied to a search system for target information. For example, the 2D map visualization system can be applied to a system in which a 2D map generated as described above is displayed on the display apparatus 32, and target information corresponding to a plot included in a region designated by a user operation in the 2D map is extracted and displayed in a list. In this case, using a 2D map in which a plurality of clusters appears in a dispersed manner, it is possible to facilitate designation of a region desired by the user. For example, by designating a desired region where clusters are generated, it is possible to extract a set of pieces of target information having a higher similarity (that is, having a strong relationship).

Second Embodiment

Figure 6:
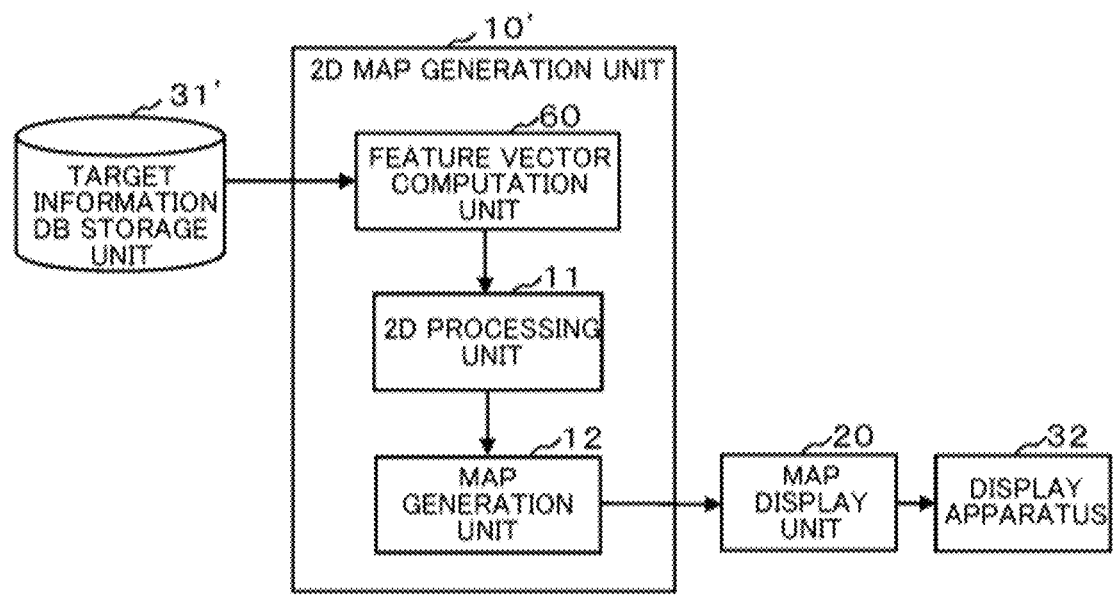
FIG. 6 is a diagram illustrating a configuration example of a 2D map visualization system including a 2D map generation apparatus according to a second embodiment.

Next, a second embodiment according to the invention will be described with reference to the drawings. FIG. 6 is a diagram illustrating a configuration example of a 2D map visualization system including a 2D map generation apparatus according to a second embodiment. Note that in FIG. 6, a component denoted by the same reference symbol as that illustrated in FIG. 1 has the same function, and thus duplicate description will be omitted here.

As illustrated in FIG. 6, the 2D asap visualization system of the present embodiment includes a 2D map generation unit 10', a map display unit 20, a target information DB storage unit 31', and a display apparatus 32 according to the second embodiment. The 2D map generation unit 10' includes a feature vector computation unit 60, the 2D processing unit 11, and the map generation unit 12 as functional configurations. Note that similarly to the configuration illustrated in FIG. 2, the server apparatus 100 may include the 2D map generation unit 10' and the target information DB storage unit 31', and the client terminal 200 may include the map display unit 20 and the display apparatus 32.

In the first embodiment described above, a description has been given of an example in which data of a plurality of feature vectors generated from a plurality of pieces of target information using the feature vector computation apparatus (not illustrated) is stored in the target information DB storage unit 31 in advance. On the other hand, in the second embodiment, the 2D map generation unit 10' includes the feature vector computation unit 60, and the feature vector computation unit 60 computes a plurality of feature vectors from a plurality of pieces of target information. That is, the target information DB storage unit 31' stores data of target information, and the feature vector computation unit 60 acquires the data of the target information from the target information DB storage unit 31' and computes a feature vector.

In the present embodiment, a description will be given on the assumption that a text (an example of text information) is used as an example of the target information. The text in the present embodiment may include one sentence (a unit separated by a period) (one statement), or include a plurality of sentences. A text including a plurality of sentences may be a part or all of a text contained in one document.

Texts stored in the target information DB storage unit 31' include texts related to various themes. For example, when the text is a medical paper, a paper on a theme of each disease is stored in the target information DB storage unit 31'. Naturally, the text stored in the target information DB storage unit 31' is not limited to the paper, and a text other than the paper describing the disease may be stored in the target information DB storage unit 31'. Further, the texts stored in the target information DB storage unit 31' way include not only those related to medical treatment but also texts related to various fields.

Figure 7:
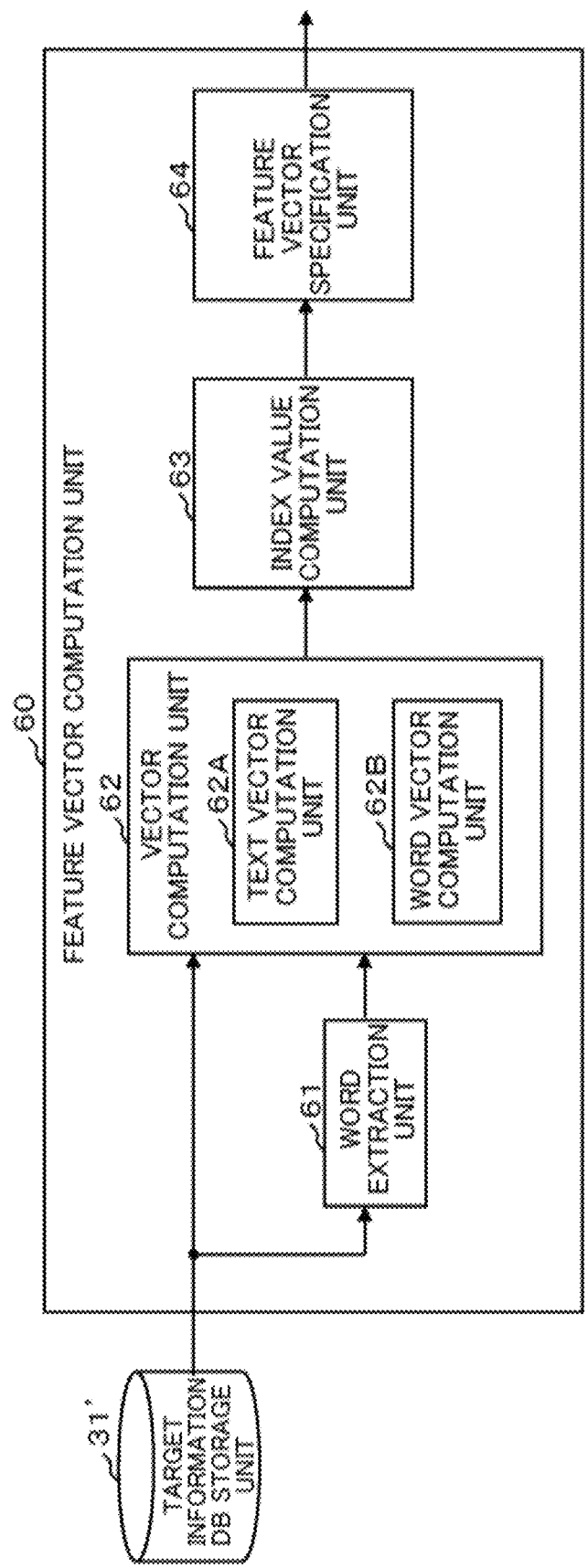
FIG. 7 is a block diagram illustrating a specific functional configuration example of a feature vector computation unit according to the second embodiment.

The feature vector computation unit 60 computes a vector having, as a plurality of elements, index values indicating text contributes to which word and to what extent as a feature vector representing a feature of target information (text). FIG. 7 is a block diagram illustrating a specific functional configuration example of the feature vector computation unit 60 for computing such a feature vector.

As illustrated in FIG. 7, the feature vector computation unit 60 of the present embodiment inputs text data as data of target information from the target information DB storage unit 31', computes a feature vector that reflects a relationship between a text and a word contained therein, and outputs the computed feature vector. The feature vector computation unit 60 includes a word extraction unit 61, a vector computation unit 62, an index value computation unit 63, and a feature vector specification unit 64 as functional configurations thereof. The vector computation unit 62 includes a text vector computation unit 62A and a word vector computation unit 62B as more specific functional configurations.

Each of the functional blocks 61 to 64 can be configured by any of hardware, a DSP, and software. For example, in the case of being configured by software, each of the functional blocks 61 to 64 actually includes a CPU, a RAM, a ROM, etc. of a computer, and is implemented by operation of a program stored in a recording medium such as a RAM, a ROM, a hard disk, or a semiconductor memory.

The word extraction unit 61 analyzes m texts (m is an arbitrary integer of 2 or more) and extracts n words (n is an arbitrary integer of 2 or more) from the m texts. As a method of analyzing texts, for example, a known morphological analysis can be used. Here, the word extraction unit 61 may extract morphemes of all parts of speech divided by the morphological analysis as words, or may extract only morphemes of a specific part of speech as words.

Note that the same word may be included in the m texts a plurality of times. In this case, the word extraction unit 61 does not extract the plurality of the same words, and extracts only one. That is, the n words extracted by the word extraction unit 61 refer to n types of words.

The vector computation unit 62 computes m text vectors and n word vectors from the m texts and the n words. Here, the text vector computation unit 62A converts each of the m texts to be analyzed by the word extraction unit 61 into a q-dimensional vector (q is an arbitrary integer larger than 3) according to a predetermined rule, thereby computing the m text vectors including q axis components. In addition, the word vector computation unit 62B converts each of the n words extracted by the word extraction unit 61 into a q-dimensional vector according to a predetermined rule, thereby computing the n word vectors including q axis components.

In the present embodiment, as an example, a text vector and a word vector are computed as follows. Now, a set $S=<d \in D, w \in W>$ including the m texts and the n words is considered. Here, a text vector $d_i \rightarrow$ and a word vector $w_j \rightarrow$ (hereinafter, the symbol "→" indicates a vector) are associated with each text $d_i$ (i=1, 2, . . . , m) and each word $w_j$ (j=1, 2, . . . , n), respectively. Then, a probability $P(w_j|d_i)$ shown in the following Equation (1) is calculated with respect to an arbitrary word $w_j$ and an arbitrary text $d_i$.

[Equation 1]

$$P(w_j \mid d_i) = \frac{\exp(\vec{w}_j \cdot \vec{d}_i)}{\sum_{k=1}^{n} \exp(\vec{w}_k \cdot \vec{d}_i)} \quad (1)$$

Note that the probability $P(w_j|d_i)$ is a value that can be computed in accordance with a probability p disclosed in, a follow known document. "'Distributed Representations of Sentences and Documents' by Quoc Le and Tomas Mikolov, Google Inc; Proceedings of the 31st International Conference on Machine Learning Held in Bejing, China on 22-24 Jun. 2014" This known document states that, for example, when there are three words "the", "cat", and "sat", "on" is predicted as a fourth word, and a computation formula of the prediction probability p is described.

The probability p(wt|wt−k, . . . , wt+k) described in the known document is a correct answer probability when another word wt is predicted from a plurality of words wt−k, . . . , wt+k. Meanwhile, the probability $P(w_j|d_i)$ shown in Equation (1) used in the present embodiment represents a correct answer probability that one word $w_j$ of n words is predicted from one text $d_i$ of m texts. Predicting one word $w_j$ front one text $d_i$ means that, specifically, when a certain text $d_i$ appears, a possibility of including the word $w_j$ in the text $d_i$ is predicted.

Note that since Equation (1) is symmetrical with respect to $d_i$ and $w_j$, a probability $P(d_i|w_j)$ that one text $d_i$ of m texts is predicted from one word $w_j$ of n words may be calculated. Predicting one text $d_i$ from one word $w_j$ means that, when a certain word $w_j$ appears, a possibility of including the word $w_j$ in the text $d_i$ is predicted.

In Equation (1), an exponential function value is used, where e is the base and the inner product of the word vector w→ and the text vector d→ is the exponent. Then, a ratio of an exponential function value calculated from a combination of a text $d_i$ and a word $w_j$ to be predicted to the sum of n exponential function values calculated from each combination of the text $d_i$ and n words $w_k$ (k=1, 2, . . . , n) is calculated as a correct answer probability that one word $w_j$ is expected from one text $d_i$.

Here, the inner product value of the word vector $w_j \rightarrow$ and the text vector $d_i \rightarrow$ can be regarded as a scalar value when the word vector $w_j \rightarrow$ is projected in a direction of the text vector $d_i \rightarrow$, that is, a component value in the direction of the text vector $d_i \rightarrow$ included in the word vector $w_j \rightarrow$, which can be considered to represent a degree at which the word $w_j$ contributes to the text $d_i$. Therefore, obtaining the ratio of the exponential function value calculated for one word $W_j$ to the sum of the exponential function values calculated for n words $w_k$ (k=1, 2, . . . , n) using the exponential function value calculated using the inner product corresponds to obtaining the correct answer probability that one word $w_j$ of n words is predicted from one text $d_i$.

Note that here, a calculation example using the exponential function value using the inner product value of the word vector w→ and the text vector d→ as an exponent has been described. However, the exponential function value may not be used. Any calculation formula using the inner product value of the word vector w→ and the text vector d→ may be used. For example, the probability may be obtained from the ratio of the inner product values itself.

Next, the vector computation unit 62 computes the text vector $d_i \rightarrow$ and the word vector $w_i \rightarrow$ that maximize a value L of the sum of the probability $P(w_j|d_i)$ computed by Equation (1) for all the set S as shown in the following Equation (2). That is, the text vector computation unit 62A and the word vector computation unit 62B compute the probability $P(w_j|d_i)$ computed by Equation (1) for all combinations of the m texts and the n words, and compute the text vector $d_i\rightarrow$ and the word vector $w_j\rightarrow$ that maximize a target variable L using the sum thereof as the target variable L.

[Equation 2]

$$L = \sum_{d \in D}\sum_{w \in W} \#(w,d)p(w|d) \qquad (2)$$

Maximizing the total value L of the probability $P(w_j|d_i)$ computed for all the combinations of the m texts and the n words corresponds to maximizing the correct answer probability that a certain word $w_j$ (j=1, 2, ..., n) is predicted from a certain text $d_i$ (i=1, 2, ..., m). That is, the vector computation unit 62 can be considered to compute the text vector $d_i\rightarrow$ and the word vector $w_j\rightarrow$ that maximize the correct answer probability.

Here, in the present embodiment, as described above, the vector computation unit 62 converts each of the m texts $d_i$ into a q-dimensional vector to compute the m texts vectors $d_i\rightarrow$ including the q axis components, and convents each of the n words into a q-dimensional vector to compute the n word vectors $w_j\rightarrow$ including the q axis components, which corresponds to computing the text vector $d_i\rightarrow$ and the word vector $w_j\rightarrow$ that maximize the target variable L by making q axis directions variable.

The index value computation unit 63 takes each of the inner products of the m text vectors $d_i\rightarrow$ and the n word vectors $w_j\rightarrow$ computed by the vector computation unit 62, thereby computing index values reflecting the relationship between the m texts $d_i$ and the n words $w_j$. In the present embodiment, as shown in the following Equation (3), the index value computation unit 63 obtains the product of a text matrix D having the respective q axis components ($d_{11}$ to $d_{mq}$) of the m text vectors $d_i\rightarrow$ as respective elements and a word matrix W having the respective q axis components ($w_{11}$ to $w_{nq}$) of the n word vectors $w_j\rightarrow$ as respective elements, thereby computing an index value matrix DW having m×n index values as elements. Here, $W^t$ is the transposed matrix of the word matrix.

[Equation 3]

$$D = \begin{pmatrix} d_{11} & d_{12} & \cdots & d_{1q} \\ d_{21} & d_{22} & \cdots & d_{2q} \\ \vdots & \vdots & \ddots & \vdots \\ d_{m1} & d_{m2} & \cdots & d_{mq} \end{pmatrix} \qquad (3)$$

$$W = \begin{pmatrix} w_{11} & w_{12} & \cdots & w_{1q} \\ w_{21} & w_{22} & \cdots & w_{2q} \\ \vdots & \vdots & \ddots & \vdots \\ w_{n1} & w_{n2} & \cdots & w_{mq} \end{pmatrix}$$

$$DW = D * W^t = \begin{pmatrix} dw_{11} & dw_{12} & \cdots & dw_{1n} \\ dw_{21} & dw_{22} & \cdots & dw_{2n} \\ \vdots & \vdots & \ddots & \vdots \\ dw_{m1} & dw_{m2} & \cdots & dw_{mn} \end{pmatrix}$$

Each element of the index value matrix DW computed in this manner may indicate which word contributes to which text and to what extent and which text contributes to which word and to what extent. For example, an element $dw_{12}$ in the first tow and the second column may be a value indicating a degree at which the word $w_2$ contributes to a text $d_1$ and may be a value indicating a degree at which the text $d_1$ contributes to a word $w_2$. In this way, each row of the index value matrix DW can be used to evaluate the similarity of a text, and each column can be used to evaluate the similarity of a word.

Figures 8, 9, 10:
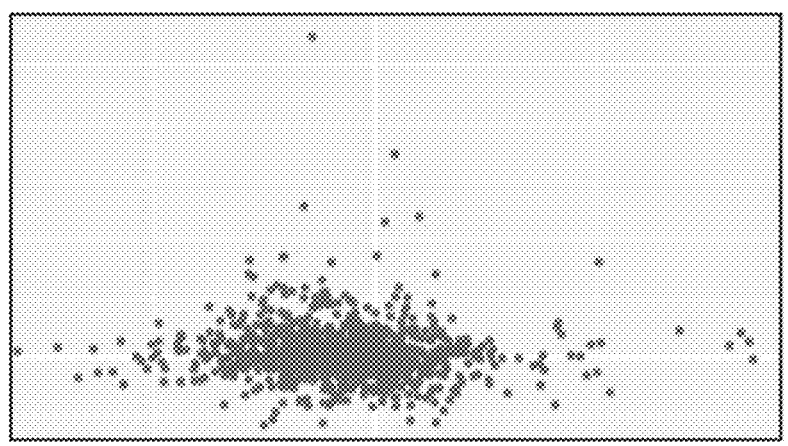
FIG. 8 is a diagram illustrating an example of a feature vector computed by the feature vector computation unit of the second embodiment.
FIG. 9 is a diagram illustrating another example of the feature vector computed by the feature vector computation unit of the second embodiment.
FIG. 10 is a diagram illustrating a conventional 2D map.

The feature vector specification unit 64 specifies, as a feature vector, a text index value group including index values of n words for one text for each of m texts. That is, as illustrated in FIG. 8, the feature vector specification unit 64 specifies a text index value group including index values of n words constituting each row of the index value matrix DV as a feature vector for each of m texts.

The 2D processing unit 11 generates 2D latitude and longitude information by performing a dimension compression process on m feature vectors computed for m texts by the feature vector computation unit 60 as described above. Specifically, the 3D processing unit 11a performs dimension compression into a matrix of m rows×3 columns by performing a dimension compression process such as PCA or SVD on the index value matrix DW of m rows×n columns including respective n index values of m feature vectors, and obtains values in the three columns as 3D coordinate information. Then, the coordinate replacement unit 11b replaces each of m pieces of 3D coordinate information generated by the 3D processing unit 11a with latitude and longitude information.

The map generation unit 12 generates a 2D map in which a plurality of texts is plotted in a 2D coordinate system of latitude and longitude based on a plurality of pieces of latitude and longitude information generated by the 2D processing unit 11 for m texts. Then, the map display unit 20 causes the display apparatus 32 to display the 2D map generated by the map generation unit 12. The 2D map displayed in this way is illustrated in FIG. 4(*b*).

As described above, the feature vector computed by the feature vector computation unit 60 of the present embodiment is information that can be used to evaluate the similarity of texts. Therefore, merely by plotting based on latitude and longitude information generated by dimensionally compressing a feature vector without particularly performing a process for computing a similarity between feature vectors unlike the conventional technology, a 2D map in which texts having a high similarity of feature vectors are plotted in a shape of a mass at close positions is generated.

In addition, according to the present embodiment, without performing processing such as defining a finite plot target area in a coordinate system of an infinite open space, a plot position of a text is appropriately determined according to a similarity of feature vectors in an original closed space including a coordinate system of latitude and longitude. For this reason, a cluster state according to a similarity is likely to occur properly at a plurality of locations, and it is possible to generate a 2D map in which a plurality of dispersed clusters is likely to appear.

As described above, the texts stored in the target information DB storage unit 31' include texts related to various themes. Here, similar words tend to be used in a plurality of texts on a particular theme. For this reason, when a 2D map is generated using a feature vector having, as elements, a text index value group (values of respective rows of the index value matrix DW) representing a Similarity of texts (the text index value group includes index values indicating text contributes to which word and to what extent), clusters are more likely to be formed by texts closely related to the particular theme. Therefore, when the 2D map visualization system according to the second embodiment is applied to the search system, it is possible to easily extract texts related to a particular theme by designating a region where a desired cluster is generated. Also in the first embodiment, when a feature vector generated similarly to the second embodiment is stored in the target information DB storage unit 31, it is possible to obtain a similar effect to that of the second embodiment.

Incidentally, data of a text stored in the target information DB storage unit 31' may be added after a 2D map is generated from m texts. For example, when x texts (x is an arbitrary integer of 1 or more) are stored in the target information DB storage unit 31' in addition to m texts, the 2D map generation unit 10' computes feature vectors for the m+x texts as analysis targets again, and regenerates a 2D map based on latitude and longitude information generated by dimensionally compressing the feature vectors.

In this instance, the 2D map generation unit 10' fixedly uses latitude and longitude information generated earlier without regenerating the latitude and longitude information related to the m texts again, and adds and generates latitude and longitude information related to the x texts. In addition, when x feature vectors computed for x texts are dimensionally compressed, dimension compression is performed using a function having the same effect as when a dimension compression process is performed on the m feature vectors.

For example, when PCA is used as the dimension compression process, main components detected when the dimension compression process is performed on the m feature vectors are taken over, and the dimension compression process is performed on the x feature vectors. In addition, when SVD is used as the dimension compression process, singular values detected when the dimension compression process is performed on the m feature vectors are taken over, and the dimension compression process is performed on the x feature vectors.

Specifically, the 2D map generation unit 10' executes processing as follows. That is, the word extraction unit 61 analyses m+x texts and extracts n words from the m+x texts. The text vector computation unit 62A converts each of the m+x texts into a q-dimensional vector according to a predetermined rule, thereby computing m+x text vectors including q axis components. The word vector computation unit 62B converts each of the n words into a q-dimensional vector according to a predetermined rule, thereby computing n word vectors including q axis components.

The index value computation unit 63 takes each of the inner products of the m+x text vectors and the n word vectors, thereby computing (m+x)×n index values reflecting a relationship between the m+x texts and the n words. The feature vector specification unit 64 specifies, as an additional feature vector, a text index value group including index values of n words for one text for each of the x texts.

The 2D processing unit 11 (3D processing unit 11a) uses a function having the same effect as when the dimension compression process is performed on the feature vector for each of the m texts to perform the dimension compression process on an additional feature vector for each of the x texts, thereby generating 2D latitude and longitude information for each of the x texts. In this dimension compression, when 3D coordinate information is generated from the feature vector (that is, when an (m+x)×n index value matrix is dimensionally compressed into an (m+x)×3 matrix), m feature vectors computed when the m texts are analyzed are fixedly used for feature vectors related to the m texts.

The map generation unit 12 generates a 2D map in which m+x texts are plotted on a 2D plane including a coordinate system of latitude and longitude based on m pieces of latitude and longitude information (original latitude and longitude information) generated for the m texts and x pieces of latitude and longitude information (added latitude and longitude information) generated for the x texts by the 2D processing unit 11.

As described above, in the present embodiment, when x texts are to be analyzed in addition to m texts, latitude and longitude information related to the m texts is fixed without being regenerated again, and dimension compression is performed using a function having the same effect as when the dimension compression process is performed on the m feature vectors, so that latitude and longitude information related to the x texts is added and generated. In this way, not only texts having a high similarity of feature vectors are merely plotted close to each other, but also implication of a region in which a cluster is formed based on the latitude and longitude information can be clearly ensured.

Implication mentioned herein means that a cluster is formed by texts closely related to a particular theme. For example, in a case where x texts added are related to a particular theme A, it is highly possible that the x texts are additionally plotted in a cluster related to the theme A formed when a 2D map is generated for m texts. That is, according to the above configuration, it is possible to generate a 2D map by adding x texts while maintaining a cluster formed when a 2D map is generated for m texts, and it is possible to plot the added x texts on a closely related cluster. Note that a 2D map may be generated by purely dimensionally compressing feature vectors for m+x texts without fixedly using latitude and longitude information generated earlier for the purpose of contrasting with a cluster formed first.

In the second embodiment, a description has been given of an example in which information to be plotted on a 2D map is a text, and in which a vector having, as a plurality of elements, index values indicating text contributes to which word and to what extent (text index value group included in one row of the index value matrix DW) is used as a feature vector. However, the inventions is not limited thereto. For example, information to be plotted on a 2D map may be a word, and a vector having, as a plurality of elements, index values indicating word contributes to which text and to what extent may be used as a feature vector. In this case, as illustrated in FIG. 9, the feature vector specification unit 64 specifies, as a feature vector, a word index value group including index values of m texts for one of n words (word index value group included in one column of the index value matrix DW) in the index value matrix DW.

In addition, in the first and second embodiments, a description has been given of an example in which a multidimensional feature vector is converted into 3D coordinate information, and then the 3D coordinate information is converted into latitude and longitude information. However, a multidimensional feature vector may be directly converted into latitude and longitude coordinates. For example, latitude information and longitude information may be generated instead of θ and φ without creating the value r used as a fixed value.

In addition, each of the first and second embodiments is merely an example of embodiment in carrying out the invention, and the technical scope of the invention should not be interpreted in a limited manner by these embodiments. That is, the invention can be implemented in various forms without departing from a gist or a main feature thereof.

REFERENCE SIGNS LIST 10, 10' 2D map generation unit (2D map generation apparatus)
11 2D processing unit
11a 3D processing unit
11b Coordinate replacement unit
12 Map generation unit
20 Map display unit
31, 31' Target information DB storage unit
32 Display apparatus
60 Feature vector computation unit
61 Word extraction unit
62 Vector computation unit
62A Text vector computation unit
62B Word vector computation unit
63 Index value computation unit
64 Feature vector specification unit

The invention claimed is:

1. A two-dimensional (2D) map generation apparatus for generating a 2D map in which a plurality of pieces of target information is plotted on a 2D plane based on a feature vector generated from target information, the apparatus comprising:
a feature vector computation unit that computes a feature vector from the target information,
a 2D processing unit that generates 2D latitude and longitude information by performing a dimension compression process on the feature vector; and
a map generation unit that generates the 2D map based on a plurality of pieces of latitude and longitude information generated by the 2D processing unit for the plurality of pieces of target information,
wherein
when m feature vectors are computed from m pieces of target information (m is an arbitrary integer of 2 or more) to generate the 2D map by dimensionally compressing the m feature vectors, and then the 2D map is regenerated by adding x pieces of target information (x is an arbitrary integer of 1 or more),
the feature vector computation unit re-computes the feature vector from m+x pieces of target information,
the 2D processing unit uses m pieces of latitude and longitude information generated from the m feature vectors as they are regarding to the m pieces of target information, and additionally generates, regarding to the x pieces of target information, x pieces of latitude and longitude information by performing a dimension compression process on x feature vectors computed from the m+x pieces of target information using a function having the same effect as when a dimension compression process is performed on the m feature vectors, and
the map generation unit generates the 2D map based on the m pieces of latitude and longitude information generated for the m pieces of target information and the x pieces of latitude and longitude information generated for the x pieces of target information by the 2D processing unit.

2. A 2D map generation apparatus for generating a 2D map in which a plurality of pieces of target information is plotted on a 2D plane based on a feature vector generated from target information,
the target information is a text, and
the feature vector is a vector having, as a plurality of elements, index values indicating text contributes to which word and to what extent, the apparatus comprising:
a word extraction unit that analyzes m texts (m is an arbitrary integer of 2 or more), and extracts n words (n is an arbitrary integer of 2 or more) from the m texts;
a text vector computation unit that converts each of the m texts into a q-dimensional vector (q is an arbitrary integer larger than 3) according to a predetermined rule, thereby computing m text vectors including q axis components;
a word vector computation unit that converts each of the n words into a q-dimensional vector according to a predetermined rule, thereby computing n word vectors including q axis components;
an index value computation unit that obtains each of inner products of the m text vectors and the n word vectors, thereby computing m×n index values reflecting a relationship between the m texts and the n words;
a feature vector specification unit that specifies, as the feature vector, a text index value group including index values of n words for one text for each of the m texts;
a 2D processing unit that generates 2D latitude and longitude information by performing a dimension compression process on the feature vector; and
a map generation unit that generates the 2D map based on a plurality of pieces of latitude and longitude information generated by the 2D processing unit for the plurality of pieces of target information.

3. The 2D map generation apparatus according to claim 2, when x texts (x is an arbitrary integer of 1 or more) are added as analysis targets in addition to the m texts,
the word extraction unit analyzes m+x texts, and extracts the n words from the m+x texts,
the text vector computation unit converts each of the m+x texts into a q-dimensional vector according to a predetermined rule, thereby computing m+x text vectors including q axis components,
the word vector computation unit converts each of the n words into q-dimensional vector according to a predetermined rule, thereby computing n word vectors including q axis components,
the index value computation unit obtains each of inner products of the m+x text vectors and the n word vectors, thereby computing (m+x)×n index values reflecting a relationship between the m+x texts and the n words,
the feature vector specification unit further specifies a text index value group including index values of n words for one text as an additional feature vector for each of the x texts,
the 2D processing unit further generates 2D latitude and longitude information for each of the x texts by performing a dimension compression process on the additional feature vector for each of the x texts using a function having the same effect as when a dimension compression process is performed on the feature vector for each of the m texts, and
the map generation unit generates the 2D map based on m pieces of latitude and longitude information generated for the m texts and x pieces of latitude and longitude information generated for the x texts by the 2D processing unit.

4. A 2D map generation apparatus for generating a 2D map in which a plurality of pieces of target information is plotted on a 2D plane based on a feature vector generated from target information, the target information is a word, and the feature vector is a vector having, as a plurality of elements, index values indicating word contributes to which text and to what extent the apparatus comprising:

a word extraction unit that analyzes m texts (m is an arbitrary integer of 2 or more), and extracts n words (n is an arbitrary integer of 2 or more) from the m texts;

a text vector computation unit that converts each of the m texts into a q-dimensional vector (q is an arbitrary integer larger than 3) according to a predetermined rule, thereby computing m text vectors including q axis components;

a word vector computation unit that converts each of the n words into a q-dimensional vector according to a predetermined rule, thereby computing n word vectors including q axis components;

an index value computation unit that obtains each of inner products of the m text vectors and the n word vectors, thereby computing m×n index values reflecting a relationship between the m texts and the n words;

a feature vector specification unit that specifies, as the feature vector, a word index value group including index values of m texts for one of the n words;

a 2D processing unit that generates 2D latitude and longitude information by performing a dimension compression process on the feature vector; and a map generation unit that generates the 2D map based on a plurality of pieces of latitude and longitude information generated by the 2D processing unit for the plurality of pieces of target information.

5. A 2D map generation method for generating a 2D map in which a plurality of pieces of target information is plotted on a 2D plane based on a feature vector generated from target information, the target information is a text, and the feature vector is a vector having, as a plurality of elements, index values indicating text contributes to which word and to what extent, the method comprising:

a first step of analyzing m texts (m is an arbitrary integer of 2 or more), and extracting n words (n is an arbitrary integer of 2 or more) from the m texts by a word extraction unit of a computer;

a second step of converting each of the m texts into a q-dimensional vector (q is an arbitrary integer larger than 3) according to a predetermined rule, thereby computing m text vectors including q axis components by a text vector computation unit of the computer, and converting each of the n words into a q-dimensional vector according to a predetermined rule, thereby computing n word vectors including q axis components by a word vector computation unit of the computer;

a third step of obtaining each of inner products of the m text vectors and the n word vectors, thereby computing m×n index values reflecting a relationship between the m texts and the n words by an index value computation unit of the computer; and a fourth step of specifying, as the feature vector, a text index value group including index values of n words for one text for each of the m texts by a feature vector specification unit of the computer;

a fifth step of generating 2D latitude and longitude information by performing a dimension compression process on the feature vector by a 2D processing unit of a computer; and a sixth step of generating the 2D map by a map generation unit of the computer based on a plurality of pieces of latitude and longitude information generated by the 2D processing unit for the plurality of pieces of target information.

6. A 2D map generation program stored on a non-transitory recording medium for causing a computer to execute a process of generating a 2D map in which a plurality of pieces of target information is plotted on a 2D plane based on a feature vector generated from target information, the target information is a text, and the feature vector is a vector having, as a plurality of elements, index values indicating text contributes to which word and to what extent, the program for causing the computer to function as:

a word extraction means that analyzes m texts (m is an arbitrary integer of 2 or more), and extracts n words (n is an arbitrary integer of 2 or more) from the m texts;

a text vector computation means that converts each of the m texts into a q-dimensional vector (q is an arbitrary integer larger than 3) according to a predetermined rule, thereby computing m text vectors including q axis components;

a word vector computation means that converts each of the n words into a q-dimensional vector according to a predetermined rule, thereby computing n word vectors including q axis components;

an index value computation means that obtains each of inner products of the m text vectors and the n word vectors, thereby computing m×n index values reflecting a relationship between the m texts and the n words;

a feature vector specification means that specifies, as the feature vector, a text index value group including index values of n words for one text for each of the m texts;

2D processing means that generates 2D latitude and longitude information by performing a dimension compression process on the feature vector; and map generating means that generates the 2D map based on a plurality of pieces of latitude and longitude information generated by the 2D processing means for the plurality of pieces of target information.

7. A 2D map generation method for generating a 2D map in which a plurality of pieces of target information is plotted on a 2D plane based on a feature vector generated from target information, the target information is a word, and the feature vector is a vector having, as a plurality of elements, index values indicating word contributes to which text and to what extent, the method comprising:

a first step of analyzing m texts (m is an arbitrary integer of 2 or more), and extracting n words (n is an arbitrary integer of 2 or more) from the m texts by a word extraction unit of a computer;

a second step of converting each of the m texts into a q-dimensional vector (q is an arbitrary integer larger than 3) according to a predetermined rule, thereby computing m text vectors including q axis components by a text vector computation unit of the computer, and converting each of the n words into a q-dimensional vector according to a predetermined rule, thereby computing n word vectors including q axis components by a word vector computation unit of the computer;

a third step of obtaining each of inner products of the m text vectors and the n word vectors, thereby computing m×n index values reflecting a relationship between the m texts and the n words by an index value computation unit of the computer; and a fourth step of specifying, as the feature vector, a word index value group including index values of m texts for one of the n words by a feature vector specification unit of the computer;

a fifth step of generating 2D latitude and longitude information by performing a dimension compression process on the feature vector by a 2D processing unit of a computer; and a sixth step of generating the 2D map by a map generation unit of the computer based on a plurality of pieces of latitude and longitude information generated by the 2D processing unit for the plurality of pieces of target information.

8. A 2D map generation program stored on a non-transitory recording medium for causing a computer to execute a process of generating a 2D map in which a plurality of pieces of target information is plotted on a 2D plane based on a feature vector generated from target information, the target information is a word, and the feature vector is a vector having, as a plurality of elements, index values indicating word contributes to which text and to what extent the program for causing the computer to function as:

a word extraction means that analyzes m texts (m is an arbitrary integer of 2 or more), and extracts n words (n is an arbitrary integer of 2 or more) from the m texts;

a text vector computation means that converts each of the m texts into a q-dimensional vector (q is an arbitrary integer larger than 3) according to a predetermined rule, thereby computing m text vectors including q axis components;

a word vector computation means that converts each of the n words into a q-dimensional vector according to a predetermined rule, thereby computing n word vectors including q axis components;

an index value computation means that obtains each of inner products of the m text vectors and the n word vectors, thereby computing m×n index values reflecting a relationship between the m texts and the n words;

a feature vector specification means that specifies, as the feature vector, a word index value group including index values of m texts for one of the n words;

2D processing means that generates 2D latitude and longitude information by performing a dimension compression process on the feature vector; and map generating means that generates the 2D map based on a plurality of pieces of latitude and longitude information generated by the 2D processing means for the plurality of pieces of target information.

\* \* \* \* \*